Patented Jan. 31, 1939

2,145,604

UNITED STATES PATENT OFFICE 2,145,604

STEEL WELDING ROD

Arthur R. Lytle, Niagara Falls, N. Y., assignor to Oxweld Acetylene Company, a corporation of West Virginia No Drawing. Application May 22, 1937, Serial No. 144,313

4 Claims. (Cl. 219—8)

The invention relates to fusion-deposition welding, referring more particularly to steel welding rods for use in gas welding.

In my copending application, Serial No. 90,886, filed July 16, 1936, I have disclosed a steel welding rod, for use particularly in high speed, multiple flame welding methods, containing between 0.2% and 1.0% silicon and substantially free from sulfur, the latter element not exceeding 0.015%. Welding rods made in accordance with that disclosure produce sound welds in gas welding processes even under the most difficult conditions.

It is relatively difficult and expensive to produce steel containing no more than 0.015% sulfur. A sulfur content between 0.015% and 0.04% is much more easily attained. Furthermore, a sulfur content within the latter range imparts a desirable resistance to excessive sparking. Accordingly, it is an object of this invention to provide a welding rod, for gas welding, containing 0.015% to 0.04% sulfur and capable of producing uniformly sound welds under all welding conditions except, perhaps, the most difficult conditions of multiple-flame, high speed automatic welding.

I have discovered that freedom from porosity, under most conditions of gas welding, may be obtained with the use of a welding rod containing as much as 0.015% to 0.04% sulfur, if the silicon content of the welding rod is correctly proportioned to the sulfur content. Specifically, if the sum of the silicon percentage and ten times the sulfur percentage is less than 0.53%, the deposited weld metal is sound; but if this sum is greater than 0.53%, the deposited weld metal may be porous unless unusual precautions are taken.

The invention is a steel welding rod, for use in fusion deposition welding, containing, in addition to iron, 0.015% to 0.04% sulfur, 0.1% to 0.4% silicon, and manganese in amounts up to about 2%, the sum of the silicon percentage and ten times the sulfur percentage being less than 0.53%. Preferably, the sulfur content does not exceed 0.025%, the silicon content is between 0.12% and 0.28%, and the sum of the silicon percentage plus ten times the sulfur percentage is between 0.33% and 0.43%. The presence of manganese in an amount between 0.9% and 1.5% is preferred, to prevent sparking and overheating.

Welding rods produced in accordance with this invention are eminently satisfactory in all common welding operations, such as the "forehand" welding of pipe, the "backhand" welding of plates, and all operations where a single flame is used. In these applications of the invention the sum of the silicon content and ten times the sulfur content of the welding rod may be as high as 0.50% to 0.53% without danger of porosity in the completed weld; but for multiple flame, high speed welding the sum should be between 0.35% and 0.43%.

Many tests of welding rods containing various amounts of silicon and sulfur confirm the validity of the above disclosed relationship and illustrate the advantages of the invention. Data typical of those obtained in these tests are set forth in the following table:

Rod analysis

| Percent S | Percent Si | Sum of percent Si+10 (percent S) | Condition of deposited metal |
|---|---|---|---|
| 0.025 | 0.4 | 0.65 | Porous |
| 0.024 | 0.3 | 0.54 | Porous |
| 0.025 | 0.27 | 0.52 | Sound |
| 0.026 | 0.23 | 0.49 | Sound |
| 0.028 | 0.39 | 0.67 | Porous |
| 0.029 | 0.26 | 0.55 | Porous |
| 0.029 | 0.18 | 0.47 | Sound |
| 0.020 | 0.26 | 0.46 | Sound |
| 0.021 | 0.28 | 0.49 | Sound |
| 0.022 | 0.27 | 0.49 | Sound |
| 0.025 | 0.26 | 0.51 | Sound |

Steel for the welding rods of this invention may be produced in the basic open hearth furnace, thereby keeping its cost low. The welding rods offer advantages not heretofore possessed by rods of the silicon-containing type in that they produce sound welds when used in any of the common methods of gas welding and have excellent resistance to sparking and overheating during welding.

I claim:

1. Steel welding rod, for gas welding, comprising 0.1% to 0.4% silicon and 0.015% to 0.04% sulfur, the sum of the silicon percentage and ten times the sulfur percentage being less than 0.53%, the remainder substantially all iron.

2. Steel welding rod, for gas welding, comprising 0.12% to 0.28% silicon and 0.015% to 0.025% sulfur, the sum of the silicon percentage and ten times the sulfur percentage being between 0.35% and 0.43%, the remainder substantially all iron.

3. Steel welding rod, for gas welding, comprising 0.1% to 0.4% silicon, 0.015% to 0.04% sulfur, and manganese in an amount not exceeding 2%, the sum of the silicon percentage and ten times the sulfur percentage being less than 0.53%, the remainder substantially all iron.

4. Steel welding rod, for gas welding, comprising 0.12% to 0.28% silicon, 0.015% to 0.025% sulfur, and 0.9% to 1.5% manganese, the sum of the silicon percentage and ten times the sulfur percentage being between 0.35% and 0.43%, the remainder substantially all iron.

ARTHUR R. LYTLE.